Figure 1:
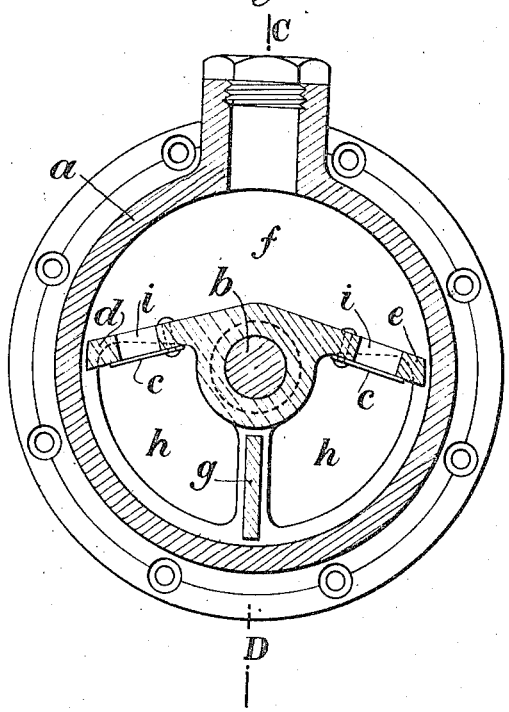

M. DERIHON.
SHOCK ABSORBER FOR MOTOR CARS AND OTHER VEHICLES.
APPLICATION FILED AUG. 6, 1917.

1,290,115.  
Patented Jan. 7, 1919.

WITNESSES

INVENTOR Martin Derihon

UNITED STATES PATENT OFFICE.

MARTIN DERIHON, OF OPENSHAW, MANCHESTER, ENGLAND.

SHOCK-ABSORBER FOR MOTOR-CARS AND OTHER VEHICLES.

1,290,115.                Specification of Letters Patent.      Patented Jan. 7, 1919.

Application filed August 6, 1917.   Serial No. 184,726.

*To all whom it may concern:*

Be it known that I, MARTIN DERIHON, a subject of the King of Belgium, residing at Openshaw, Manchester, England, have invented certain new and useful Improvements in Shock-Absorbers for Motor-Cars and other Vehicles, of which the following is a specification.

This invention relates to shock absorbers for motor-cars and other suspended vehicles said shock absorbers being of that kind described in my United States Patent No. 1068329 dated the 22nd day of July, 1913, the construction of the shock absorber being such that it permits of the free compression and the free expansion of the suspension spring and exercises a retarding action only on the return movements toward the normal position. This retarding action is of a constant value in the two directions, however great may be the amplitudes of vibration of the suspension springs.

The said prior patent described how the above result could be attained by means of a cylinder or chamber filled with oil or other fluid and containing a piston or pistons or rotary blades, connected with the axle of the vehicle and arranged in such a manner as not to exercise any influence on the elastic compression and expansion of the springs, that is to say, on the relative displacements which occur between the chassis of the vehicle and the hub of the wheels when the latter encounter an unevenness or a depression in the road, but to retard the rapidity of the return movements toward the normal position (which follow the said compression or the said expansion of the spring) and this with a constant resistance whatever may be the position taken by the piston or the blades.

The specification of the said Patent No. 1068329 particularly described an arrangement comprising valves carried by two blades in one piece, which are movable in relation to a fixed wall or partition in an oil cylinder, in such a manner that either one or the other of the said valves opens according to the direction of displacement from the normal position of the spring. The portion of the cylinder between each of the two blades (placed in the normal position) and the fixed wall is bored to a diameter larger than that of the circumference described by the external edges of the blades, so as to allow the blade, which has been brought to that part, to oscillate without any resistance, while the other blade then engaged in the truly-bored portion of the cylinder, acts as a piston when the blade returns to the normal position.

The present invention relates to a modification of the above arrangement, and consists in the provision of a recess at the end of the cylinder for the passage of the oil from the chambers comprised between each of the blades and the fixed wall or partition into the chamber inclosed between the two blades, instead of a portion of the cylinder being bored to a larger diameter for this purpose.

Figure 2:
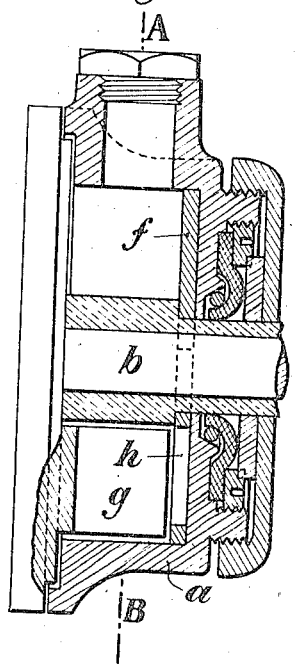

Figure 1 of the accompanying drawings is a section through a shock absorber constructed according to the present invention, the section being taken through A—B (Fig. 2).

Fig. 2 is a section on line C—D (Fig. 1).

The apparatus consists of an oil cylinder $a$ partitioned in the middle by a transverse stop plate $g$. A double piston $e$—$d$ moves in the cylinder $a$ on one side and the other of the partition $g$, around pin $b$. Cylinder $a$ is fixed to the chassis of the vehicle, while the blades $e$—$d$ are connected with the axle by means of a lever and a suitable link gear.

Each of the pistons $e$ and $d$ has a drilled opening $i$; these openings $i$ are closed alternately by flaps or valves $c$ which can open downward.

In order to admit of the oil passing freely from one side to the other of the piston, while the latter is moved away from the normal position, a passage is formed at the lateral edges of the blades. For this purpose the end or cover of the cylinder $a$ is hollowed or recessed between the normal position of the blades $e$ and $d$ and the fixed partition $g$. This hollowed or recessed part may conveniently be produced by placing within the end of the cylinder a disk $f$ provided with recesses or openings $h$ which establish communication between the two compartments of the cylinder $a$ when the corresponding blade approaches the partition $g$.

From the above, it follows that when the spring of the vehicle is compressed or expands, the blades $e$ and $d$ oscillate around pin $b$, and the valve $c$ of the blade which moves upward then opens, while the blade which moves downward opens the conduit establishing the communication between the two compartments of cylinder $a$.

In this manner, no retarding action is produced. On the contrary, during the return motion, the valve of the blade which redescends, closes and produces the retarding action. This retarding action is constant however large may be the displacement of the vanes.

Having fully described my invention, what I desire to claim and secure by Letters Patent is:—

A shock absorber for vehicles comprising a casing adapted to contain a fluid, a fixed partition therein, two piston blades movable in the casing relatively to the fixed partition, valves carried by the blades adapted respectively to open according to the direction of movement of the blades from the normal position, and a plate located in the end of the casing and having recesses or openings situated between the normal position of the blades and the fixed partition.

In testimony whereof I have hereunto set my hand in presence of two subscribing witnesses.

MARTIN DERIHON.

Witnesses:
 CHAS. P. PRESSLY,
 DOLPHY KAHN.